Patented Oct. 20, 1931

1,827,742

UNITED STATES PATENT OFFICE

JAMES B. GRENAGLE, OF BALTIMORE, MARYLAND, ASSIGNOR OF ONE-HALF TO WILLIAM W. VARNEY, OF BALTIMORE, MARYLAND

MOLD LINING

No Drawing. Application filed September 26, 1929. Serial No. 395,467.

The object of my invention is the construction of a mold in which high refractory metals may be cast.

A further object of my invention is the production of a refractory material suitable for lining purposes.

A further object of my invention is an improved process of molding.

A further object of my invention is the production of a permanent mold suitable for casting and re-casting high refractories.

With the foregoing and other objects in view, my invention consists of the methods employed, combination and arrangement of systems and means as hereinafter specifically provided, but it is understood that changes, variations and modifications may be resorted to which come within the scope of the claim hereunto appended.

In the manufacture of many articles out of high refractories, it is desirable to cast them into comparatively smooth final shape and ready for use. Among such articles, I might mention lathe tools and other cutting machines, blanks for making finished cutters, rolls, chemical dishes, and innumerable other objects.

In acomplishing this object, I prepare a cement consisting of calcined celite (sil-o-cel cement), long fibrous asbestos and zirconium ($ZrO_2$), preferably in about equal proportions of each. I mix this cement with water until I obtain a rather stiff paste. This I use as a molding material, or lining, for my flask. The pattern I use should be of metal in order to equally transmit heat in the drying process to be free of absorption of moisture and expanding when heated. I have found that ordinary brass, or alloys containing copper, of sufficiently high melting temperature to withstand the calcining or drying, are satisfactory.

I mold in the ordinary way, placing the metal pattern preferably as cold as possible into a flask as near the shape of the mold desired as possible, permitting sufficient lining, or molding material not less than about ½ inch on all sides; into this I ram the cement mixed as above very firmly and until water floats on top to insure a complete packing or solidification around the pattern. If there is to be a coping I divide the pattern and the lining with oiled paper or other suitable parting, such as talc, graphite, etc., then place the coping with its rammed lining in place and firmly secure the flask together. This, then, is calcined or dried under a temperature preferably exceeding 1200° F. for a considerable time, preferably two days, when the mold and its lining become thoroughly hard and dry. When the pattern made of metal becomes heated it expands, which is a very desirable feature; and when it cools it contracts, which is equally desirable, as it may then be easily removed from the mold.

As an illustration, I make cast iron molds or flasks for casting lathe tools, planer tools and shaper tools of varying sizes and shapes, the pattern, as suggested above, being of brass finished so as to give a smooth, finished pattern. The flask is lined with at least ½ inch, or more, of the cement or coating mentioned above, which is molded around the form or pattern within the cast iron flask holding the same. When this mold is prepared in the manner described and calcined, I am able to pour fluid tool metal of a self-hardening type therein, and the tools may be withdrawn from the mold without destroying either mold or lining, and I am thus enabled to use the same mold or lining repeatedly for casting purposes.

Having thus described my invention, what I claim and desire to secure by Letters Patent is:

A mold lining comprising celite, asbestos and zirconium oxide.

JAMES B. GRENAGLE.